April 30, 1946.   P. W. OTT   2,399,503
TESTING APPARATUS OF THE VIBRATORY MOTION TYPE
Filed Aug. 26, 1943   2 Sheets-Sheet 1
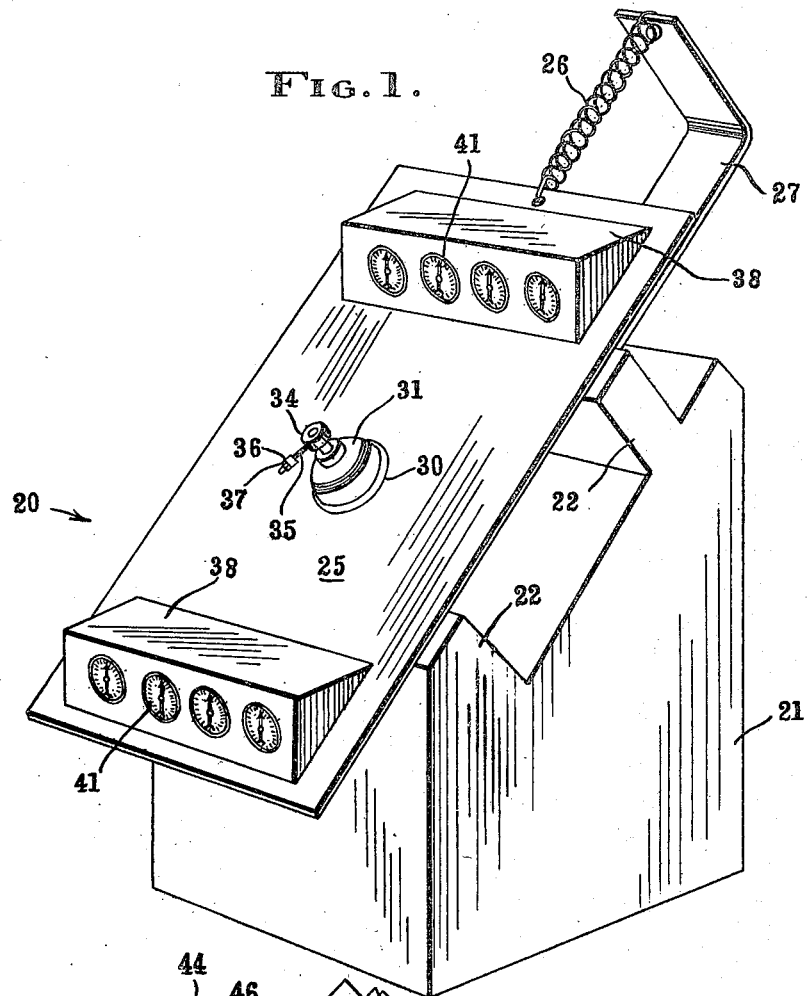
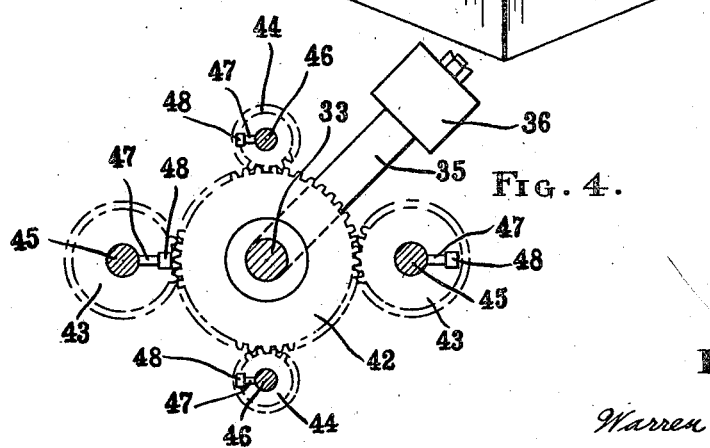
INVENTOR
Percy W. Ott
BY
Warren H. F. Schmieding
ATTORNEY April 30, 1946.  P. W. OTT  2,399,503
TESTING APPARATUS OF THE VIBRATORY MOTION TYPE
Filed Aug. 26, 1943  2 Sheets-Sheet 2

INVENTOR
Percy W. Ott
BY
Warren H. F. Schmieding
ATTORNEY

Patented Apr. 30, 1946

2,399,503

UNITED STATES PATENT OFFICE 2,399,503

TESTING APPARATUS OF THE VIBRATORY MOTION TYPE

Percy W. Ott, Columbus, Ohio, assignor to Ranco Incorporated, Columbus, Ohio, a corporation of Ohio Application August 26, 1943, Serial No. 500,050

6 Claims. (Cl. 73—67)

This invention relates generally to testing equipment for airplane and other instruments and in its more specific aspects is directed to mechanism for subjecting such instruments to vibrations having specific characteristics.

In the manufacture of certain types of airplane instruments such, for example, as manifold pressure gages, certain requirements of the Federal Aeronautical Authorities must be satisfied. In order to determine whether the finished instruments conform to these requirements, tests must be conducted thereon after the construction work has been substantially completed. One of the specific requirements is that the instruments be so vibrated that a point thereon shall describe a circle of a specified diameter in a plane disposed at an angle of 45 degrees to the horizon without deleterious effects on the instruments, the vibrations being of certain specified frequencies.

An object of this invention resides in the provision of apparatus which will develop the specific vibrations required and which will also be formed with means for supporting one or more instruments to be tested.

Another object of the invention resides in the provision of apparatus which will produce orbicular vibrations of varying frequencies and magnitudes in a plane disposed at an angle to the vertical.

A further object resides in providing a testing device having a body member supported in an inclined plane and having means associated therewith for imparting orbicular vibrations thereto in the plane in which it is supported, the body member also having means provided in connection therewith for receiving and retaining the instruments during the testing operations.

A still further object of the invention resides in the provision of a testing machine having a base on which a body member is carried, the mounting for the body member being such as to permit substantially unrestricted movement thereof in an inclined plane, and providing the body member with a power driven, rotatable eccentric mass which will cause the same to move in a circular path in the inclined plane at a rate proportional to the speed of rotation of the eccentric, the body member having means for holding the instruments to be tested.

An object of the invention also resides in providing means for adjusting or varying the eccentricity of the mass in order to change the amplitude of the vibrations imparted to the body member and the instruments carried thereby.

Another object of the invention resides in the provision of testing mechanism having means to produce orbicular vibrations in an element in a selected plane and additional means associated with the first means for producing harmonic vibrations in the element, either in the same or angularly related planes.

Further objects and advantages of the present invention will be apparent from the following description, reference being had to the accompanying drawings wherein a preferred form of embodiment of the invention is clearly shown.

In the drawings:

Fig. 1 is a perspective view showing a machine formed in accordance with the present invention and showing the instruments, to be tested, in testing position;

Figure 2:
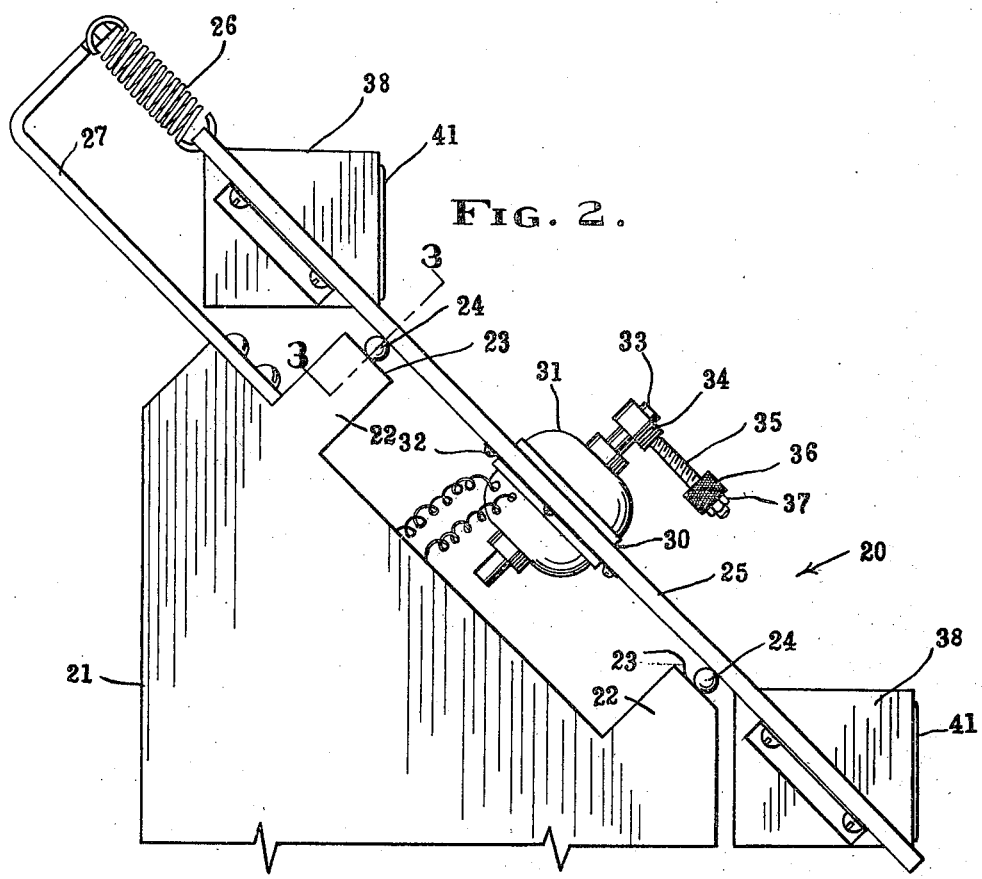
Fig. 2 is a side elevational view of the machine shown in Fig. 1.
Figure 3:
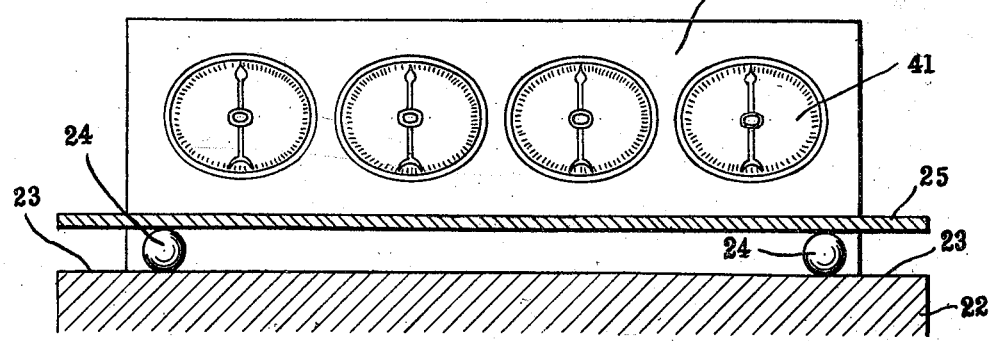
Fig. 3 is a detail transverse sectional view taken on the plane indicated by the line 3—3 of Fig. 2; and, Fig. 4 is a diagrammatic view of a modification of the invention designed to produce harmonic vibrations in addition to the main vibrations.

Referring more particularly to the drawings, the testing machine is designated generally by the numeral 20. In the present instance, this machine is formed to include a base 21 which may be constructed in any suitable manner and of such materials that it will possess sufficient weight to be unaffected by vibrations produced in the operation of the machine. This base includes a pair of projections 22 which extend outwardly and upwardly therefrom and are provided at their outer ends with finished surfaces 23 for the reception of ball bearings 24. The surfaces 23 should be highly polished in order to eliminate, as nearly as possible, all traces of friction between the bearings 24 and the surfaces 23. In the present illustration, the surfaces 23 are disposed in alignment with one another and are arranged at an angle of 45 degrees with respect to the vertical. The bearings 24 serve to support, for substantially unrestricted movement thereon, a plate-like body 25 which may be of any suitable material, one requirement being that the portions of the surface engaged by the balls 24 possess a smooth wear resisting finish to reduce friction at these points.

To prevent the body from moving off the base under the influence of gravity, a coil spring 26 is connected at one end to the front edge of the body and at the other end to a bracket 27 projecting from the upper portion of the base 21. This spring yieldably opposes the movement of the body in response to gravitational force but does not otherwise interfere with the movement of the body on the balls 24. It will be seen at this time that the body is capable of substantially unrestricted movement in any direction, at least for a limited distance, in the plane of the plate.

To effect vibratory movement of the plate, it is provided at the central portion thereof with an opening 30 in which an electric motor 31 is disposed. This motor 31 may be secured by any suitable means, such as screws 32, to the plate to prevent relative movement between these elements. The armature shaft 33 of the motor has a collar 34 secured thereto and a threaded stud 35 projects laterally from one side of the collar 34. A counterweight 36 is adjustably received by the threaded stud and a lock nut or other suitable locking device 37 is employed to retain the counterweight 36 in various positions of longitudinal adjustment on the stud. The end portions of the plate 25 are equipped with housings 38 of such type that the instruments 41 to be tested may be secured therein with the indicator dials exposed to view, the instruments being disposed in the same, or normal, positions occupied thereby during use.

In the operation of the machine, the instruments to be tested are positioned in the housings 38 and when the motor is operated, the counterweight 36 will be revolved about the axis of the armature shaft. Due to the eccentricity of the counterweight, with respect to the axis of the armature shaft, a reaction will be imparted to the plate 25 and it will move in a circular or orbicular path, the diameter of which will be determined by the degree of eccentricity and the weight of the counterweight 36. If desired, suitable control devices, not shown, may be provided to govern the speed of the motor 31 and, consequently, govern the frequencies of the vibrations imparted to the body 25. It should be observed that, if desired, additional counterweights may be added either to the stud 35 or to another stud which might be applied to the opposite end of the armature shaft.

It will be noted from Fig. 2 that the motor and counterweight are disposed substantially midway between the bearings 24 and that the housings 38 for the instruments to be tested are spaced equal distances from the motor. This arrangement, while not absolutely essential, provides a more nearly balanced condition and will result in better action on the part of the vibrator. From experiments conducted, it has been found that the natural frequency of the resiliently mounted mass including the body and all the elements carried thereby, is much lower (⅕ to ¹⁄₁₀₀) than the speed of the motor 31. Thus, by varying the speed of the motor, the desired frequency of vibrations imparted to the instruments may be secured.

From the foregoing, it will be apparent that by the arrangement of parts as described, a machine has been provided which will cause any selected point on any instrument being tested to describe a circle in a plane disposed at 45 degrees to the horizon which movement will produce the same effect on the instrument as if it were simultaneously vibrated back and forth and laterally in a horizontal plane and up and down in a vertical plane, the distances of movement in each direction being determined by the diameter of the circle of movement.

In some instances it has been found desirable to introduce additional vibrations having different frequencies than the main vibrations. These additional vibrations, known as harmonics, may be generated by the addition of mechanism of the type shown in Fig. 4. This mechanism includes a gear 42 secured for rotation with the armature shaft 33 of the motor 31 and one or more sets of gears 43 and 44, fixed for rotation with countershafts 45 and 46, the gears 43 and 44 being in meshing engagement with the gear 42. The countershafts 45 and 46 carry laterally projecting studs 47 on which secondary counterweights 48 are mounted. In the present showing the gears of the sets 43 and 44 are disposed on opposite sides of the gear 42 and are of such predetermined size, relative to the gear 42, as to produce harmonic vibrations of the desired frequencies. As illustrated in Fig. 4, the secondary counterweights 48 are disposed on corresponding sides of their respective axes of rotation whereby these weights operate in unison to produce the vibrations. The secondary counterweights are employed in pairs to secure a more perfectly balanced condition of operation. It will be obvious from the foregoing that if additional harmonic vibrations are desired additional pairs of pinions and secondary counterweights may be added. The secondary counterweights may be adjusted longitudinally of the studs in the same manner as the weight 36 to change the amplitude of the harmonic vibrations.

While the form of embodiment of the present invention as herein disclosed constitutes a preferred form, it is to be understood that other forms might be adopted, all coming within the scope of the claims which follow.

I claim:

1. An instrument testing device comprising a support having a supporting surface disposed in an inclined plane; a body member; bearing means disposed between the supporting surface and the body member for supporting said body member for substantially unrestricted movement in an inclined plane; means for resiliently retaining said body member against gravitational movement off said supporting surface; means associated with said body member for supporting an instrument to be tested; a rotatable element; and an eccentric mass carried by the element, said element being supported by said body member for rotary movement in a plane substantially parallel to the plane of movement of said body member whereby said mass causes orbicular vibrations to be imparted to the body member in said inclined plane.

2. Apparatus for subjecting instruments to specific vibrations comprising a support having an inclined plane surface; a plate-like body; bearing means disposed between said body and the plane surface on said support; means for resiliently retaining said body against gravitational movement off said support; means on said body for receiving an instrument to be tested; and power driven means carried by said body for imparting circular vibratory movement thereto in a plane parallel to said inclined surface.

3. Apparatus for subjecting instruments to specific vibrations comprising a support having an inclined plane surface; a plate-like body; bearing means disposed between said body and the plane surface on said support; means for yieldably resisting gravitational movement of said body; instrument holding means provided on said body; motor means supported on said body; and counterweight means carried by and rotatable with the armature shaft of said motor, rotary movement of said counterweight serving to impart orbicular vibrations to said body in the plane thereof.

4. Apparatus for subjecting instruments to specific vibrations comprising a support having an inclined plane surface; a plate-like body; ball bearings disposed between the upper and lower portions of said body and the inclined surface of said support; spring means between said support and body to yieldably resist gravitational movement of the latter; an electric motor secured to said body substantially midway between said ball bearings; instrument receiving means mounted on said body at opposite sides of said motor; and eccentric mass means carried by the armature shaft of said motor, rotation of said shaft and mass serving to impart orbicular vibrations to said body in the plane thereof.

5. An instrument testing device comprising, a support having a supporting surface disposed at an inclined plane of substantially 45° from the horizontal; a body member; bearing means disposed between the supporting surface and the body member for supporting said body member for substantially unrestricted movement in an inclined plane at substantially 45° from horizontal; means for resiliently retaining said body member against gravitational movement off said supporting surface; means associated with said body member for supporting an instrument to be tested; a rotatable element; and an eccentric mass carried by the element, said element being supported by said body member for rotary movement in a plane substantially parallel to the plane of movement of said body member whereby said mass causes orbicular vibration to be imparted to the body member in said inclined plane.

6. An instrument testing device comprising, a support having a supporting surface disposed in an inclined plane; a body member; bearing means disposed between the supporting surface and the body member for supporting said body member for substantially unrestricted movement in an inclined plane; spring means for resiliently retaining said body member against gravitational movement off said supporting surface; means associated with said body member for supporting an instrument to be tested; a rotatable element; and an eccentric mass carried by the element, said element being supported by said body member for rotary movement in a plane substantially parallel to the plane of movement of said body member whereby said means causes orbicular vibrations to be imparted to the body member in said inclined plane.

PERCY W. OTT.